(12) United States Patent
Magnusson et al.

(10) Patent No.: US 10,877,193 B2
(45) Date of Patent: Dec. 29, 2020

(54) POLARIZATION INDEPENDENT WIDEBAND REFLECTORS AND METHODS FOR THEIR MANUFACTURE

(71) Applicants: Robert Magnusson, Arlington, TX (US); Manoj Niraula, Benbrook, TX (US); Yeong Hwan Ko, Grand Prairie, TX (US); Kyu Jin Lee, Euless, TX (US)

(72) Inventors: Robert Magnusson, Arlington, TX (US); Manoj Niraula, Benbrook, TX (US); Yeong Hwan Ko, Grand Prairie, TX (US); Kyu Jin Lee, Euless, TX (US)

( * ) Notice: Subject to any disclaimer, the term of this patent is extended or adjusted under 35 U.S.C. 154(b) by 0 days.

(21) Appl. No.: 15/267,830

(22) Filed: Sep. 16, 2016

(65) Prior Publication Data
US 2017/0082786 A1  Mar. 23, 2017

Related U.S. Application Data

(60) Provisional application No. 62/222,070, filed on Sep. 22, 2015.

(51) Int. Cl.
*G02B 5/18* (2006.01)
*G02B 27/42* (2006.01)

(52) U.S. Cl.
CPC ....... *G02B 5/1861* (2013.01); *G02B 27/4277* (2013.01); *G02B 27/4288* (2013.01)

(58) Field of Classification Search
CPC ........ G02B 5/18; G02B 5/203; G02B 5/1861; G02B 5/1866; G02B 5/208; G02B 5/1814; G02B 27/42; G02B 27/4277; G02B 27/46; G02B 27/4288; G02B 6/124; G02B 5/1809
USPC ............... 359/359, 566, 569, 563, 568, 576; 385/37

See application file for complete search history.

(56) References Cited

U.S. PATENT DOCUMENTS

| | | | | |
|---|---|---|---|---|
| 4,251,137 A | * | 2/1981 | Knop | ........................ G02F 1/01 349/201 |
| 2013/0301988 A1 | * | 11/2013 | Monmayrant | ............ G01J 3/18 385/37 |

* cited by examiner

*Primary Examiner* — Jie Lei

(57) ABSTRACT

Unpolarized broadband reflectors enabled by a serial arrangement of a pair of polarized subwavelength gratings are disclosed. Device illustrations include partially-etched crystalline-silicon films on quartz substrates and amorphous silicon films on glass. The individual reflectors exhibit extremely wide spectral reflection bands in one polarization. By arranging two such reflectors sequentially with orthogonal periodicities, there results an unpolarized spectral band that exceeds those of the individual polarized bands. In the prototypes disclosed, there results zero-order reflectance exceeding 97% under unpolarized light incidence over a 500-nm-wide wavelength band. This wideband represents a ~44% fractional band in the near infrared spectral band. The elemental polarization-sensitive reflectors based on one-dimensional resonant gratings have simple design, robust performance, and are straightforward to fabricate. Hence, this technology is a promising alternative to traditional multilayer thin-film reflectors especially at longer wavelengths of light where multilayer deposition may be infeasible or impractical.

17 Claims, 8 Drawing Sheets

POLARIZATION INDEPENDENT WIDEBAND REFLECTORS AND METHODS FOR THEIR MANUFACTURE

CROSS REFERENCE TO RELATED APPLICATION

This application claims priority pursuant to 35 U.S.C. § 119(e) to U.S. Provisional Patent Application Ser. No. 62/222,070, filed on Sep. 22, 2015, which is hereby incorporated by reference in its entirety.

STATEMENT REGARDING FEDERALLY SPONSORED RESEARCH

This invention was created with government support under grant number PF-AIR 1444922 awarded by the National Science Foundation. The government therefore has certain rights in the invention.

FIELD

This invention relates to a facile method to fabricate wideband unpolarized reflectors spectral ranges extending from the visible region to the millimeter or microwave regions. By arranging two or more one-dimensional grating-type resonant reflectors sequentially with orthogonal periodicities, there results an unpolarized spectral band that exceeds those of the individual polarized bands.

BACKGROUND OF THE INVENTION

Resonant broadband reflection arising from optical devices fashioned with subwavelength gratings is a functional basis for a host of applications, including low-loss mirrors [R. Magnusson, "Wideband reflectors with zero-contrast gratings," Opt. Lett. 39, 4337-4340 (2014); C. F. R. Mateus, M. C. Y. Huang, C. J. Chang-Hasnain, and V. Suzuki, "Broad-band mirror (1.12-1.62 µm) using a subwavelength grating," IEEE Phot. Tech. Lett. 16, 1676-1678 (2004)], narrow-linewidth bandpass filters [M. Niraula, J. W. Yoon, and R. Magnusson, "Mode-coupling mechanisms of resonant transmission filters," Opt. Exp. 22, 25817-25829 (2014)], beam-transforming surfaces [D. Fattal, J. Li, Z. Peng, M. Fiorentino, and R. G. Beausoleil, "Flat dielectric grating reflectors with focusing abilities," Nat. Photon. 4, 466-470 (2010)], and polarizers [S. V. Chou and W. Deng, "Subwavelength amorphous silicon transmission gratings and applications in polarizers and waveplates," Appl. Phys. Lett. 67, 742-744 (1995); K. J. Lee, J. Curzan, M. Shokooh-Saremi, and R. Magnusson, "Resonant wideband polarizer with single silicon layer," Appl. Phys. Lett. 98, 21112 (2011)]. Devices in this class are often designed with a single dielectric thin-film layer, and incorporate carefully-crafted grating architectures for a particular application. Comparatively, obtaining a similar performance using traditional distributed Bragg stacks could require a large number of layers; perhaps ~30-40 quarter- and/or half-wave layers. Multilayer thin-film-based broadband dielectric mirrors represent an established technology. Their commercial manufacturers deposit multilayer films with high precision in layer thickness and index of refraction. The performance (reflectivity and bandwidth) of such a mirror depends on the number of quarter-wave Bragg stacks with increasing number of layers in a mirror typically improving its performance [H. A. Macleod, Thin-Film Optical Filters (McGraw-Hill, New York, ed. 2, 1989)]. In the case of subwavelength grating mirrors, high performance is a matter of parametric optimization [R. Magnusson, "Wideband reflectors with zero-contrast gratings," Opt. Lett. 39, 4337-4340 (2014); C. F. R. Mateus, M. C. Y. Huang, C. J. Chang-Hasnain, and Y. Suzuki, "Broad-band mirror (1.12-1.62 µm) using a subwavelength grating," IEEE Phot. Tech. Lett. 16, 1676-1678 (2004)], with minimal effect on the fabrication process. Moreover, at longer wavelengths of light, in mid-infrared and THz domains for instance, multiple layer deposition becomes impractical on account of typically-slow deposition techniques and issues in maintaining consistent deposition conditions across long time spans. In the case of single-layer subwavelength grating mirrors, their designs can easily be scaled to be operative at long wavelengths spanning µm- to mm- to microwave wavelength values. Practical challenges in fabrication include the need for periodic patterning, precision control of etching processes to maintain grating features, and management of process-induced scattering centers.

Broadband light reflection from a single-layer subwavelength grating is an interesting optical phenomenon as materials generating this effect are optically transparent in nature. This phenomenon is understood as a low-Q broadband resonance effect, driven by laterally-guided Bloch modes. Gratings diffract incident light, generating for example the ±1 evanescent diffraction orders in the high-index periodic layer. Resonant coupling between the incident and diffracted fields drives laterally propagating multiple leaky-modes, and causes near-complete light re-radiation to the incidence medium [R. Magnusson, "Wideband reflectors with zero-contrast gratings," Opt. Lett. 39, 4337-4340 (2014); Y. Ding and R. Magnusson, "Resonant leaky-mode spectral-band engineering and device applications," Opt. Exp. 12, 5661-5674 (2004)]. It has been shown that broadband mirrors based on one-dimensional (1D) subwavelength gratings can support wide reflection bands with efficiencies exceeding 99.99% [R. Magnusson, "Wideband reflectors with zero-contrast gratings," Opt. Lett. 39, 4337-4340 (2014)]. One-dimensional gratings have their periodicity running only along a single direction along which the grating vector points.

FIG. 1(a) shows a schematic model representative of 1D resonant periodic device. We call this variety a "zero-contrast grating" (ZCG) as the grating ridges are matched to a sublayer made out of the same material; hence, no phase changes occur for a ridge mode transiting across the ridge/sublayer interface [R. Magnusson, "Wideband reflectors with zero-contrast gratings," Opt. Lett. 39, 4337-4340 (2014)]. We show a two-layer element in air that is the canonical architecture to be pursued under this disclosure. Under normal incidence, counter-propagating leaky modes form a standing wave in the device as indicated in FIG. 1(a). As the modes interact with the waveguide grating, they re-radiate reflectively [D. Rosenblatt, A. Sharon, and A. A. Friesem, "Resonant grating waveguide structure," IEEE J. Quantum Electron., vol. 33, pp. 2038-2059, November 1997]. A schematic dispersion diagram is shown in FIG. 1(b). The device works in the second stop band corresponding to the second-order grating [V. Ding and R. Magnusson, "Band gaps and leaky-wave effects in resonant photonic-crystal waveguides," Opt. Express, vol. 15, pp. 680-694, Jan. 22, 2007]. A given evanescent diffraction order can excite not just one but several leaky modes. To emphasize this point, in FIG. 1(b) we show the stop bands for the first two transverse electric (TE) modes. At each stop band, a resonance is generated as denoted in FIG. 1(b). The fields radiated by these leaky modes in a grating with a symmetric profile can be phase or out of phase at the edges of the band [R. F. Kazarinov and C. H. Henry, "Second-order distributed feedback lasers with mode selection provided by first-order radiation loss," IEEE J. Quantum Electron., vol. 21, pp. 144-150, February 1985]. At one edge, there is a zero phase difference, and hence the radiation is enhanced while at the other edge, there is a π phase difference inhibiting the radiation. In this case, if $\beta=\beta_R+j\beta_1$ is the complex propagation constant of the leaky mode, then $\beta_1=0$ at one edge, which implies that no leakage is possible at that edge. For asymmetric grating profiles, there is a resonance at each band edge [Y. Ding and R. Magnusson, "Band gaps and leaky-wave effects in resonant photonic-crystal waveguides," Opt. Express, vol. 15, pp. 680-694, Jan. 22, 2007]. Spectral characteristics and local fields of guided-mode resonance (GMR) [Y. Ding and R. Magnusson, "Resonant leaky-mode spectral-band engineering and device applications," Opt. Exp. 12, 5661-5674 (2004)] devices can be expeditiously quantified with exact numerical methods, for example, with rigorous coupled-wave analysis (RCWA) computer codes [T. K. Gaylord and M. G. Moharam, "Analysis and applications of optical diffraction by gratings," in Proc. IEEE, vol. 73, pp. 894-937, 1985; M. G. Moharam, D. A. Pommet, E. B. Grann, and T. K. Gaylord, "Stable implementation of the rigorous coupled-wave analysis for surface-relief gratings: enhanced transmittance matrix approach," J. Opt. Soc. Am. A, vol. 12, pp. 1077-1086, May 1995].

More particularly, FIG. 1(a) provides a schematic view of a subwavelength periodic element under normal incidence. A two-layer element with thicknesses $d_g$ and $d_h$, fill factor F, and a two-part period Λ is illustrated with the refractive indices of the various regions (cover, device, substrate) denoted as n. When phase matching occurs between evanescent diffraction orders and a waveguide mode, a reflection resonance takes place. In the figure, I, R, and T denote the incident wave with wavelength reflectance, and transmittance, respectively. Moreover, FIG. 1(b) renders a schematic dispersion diagram of a subwavelength grating at the second stop band. For the symmetric grating profile, a resonance appears at one edge. This picture applies to both TE (electric field vector normal to the plane of incidence and parallel to the y-direction) and TM (magnetic field vector normal to the plane of incidence and parallel to the y-direction) polarization states. Here, the grating vector has magnitude $K=2\pi/\Lambda$, the wavenumber of the input wave is $k_0=2\pi/\lambda$, and β is the propagation constant of a leaky mode. In the subwavelength regime, R denotes the zero-order reflectance often denoted by $R_0$.

We use the particle-swarm optimization (PSO) [J. Kennedy and R. Eberhart, "Particle swarm optimization," Proceedings of the IEEE International Conference on Neural Networks, vol. 4, pp. 1942-1948, (1995)] method to tune the geometrical parameters of the subwavelength element in FIG. 1(a) to design a wideband reflector. Our PSO code uses a RCWA algorithm for forward calculation. In the PSO design, for example, we demand reflectance efficiency as R>99% for a ~500 nm spectral band centered about 1200 nm for TM polarization. The resulting spectrum for an optimized device with parameters $n_C=1$ (air, or vacuum), $n_d=3.51$ nominally (silicon), $n_S=1.52$ nominally (quartz), Λ=560 nm, F=0.66, $d_g=332$ nm, and $d_h=188$ nm is shown in FIG. 2(a). Dispersion of the refractive indices of Si and quartz is accounted for in the calculations. The broadband spectral response encompasses a 430-nm-wide spectral band from 1030 nm to 1460 nm with R exceeding 99%. Simulated TE spectrum of the same device in FIG. 2(b) does not exhibit wideband spectral response. Thus, wideband reflection in this one-dimensional (1D) grating architecture is limited to a single polarization.

BRIEF SUMMARY OF THE INVENTION

We disclose a facile method to fabricate wideband unpolarized reflectors in spectral ranges extending from the visible region to the millimeter or microwave regions. Resonant reflectors made with one-dimensional grating-type architectures exhibit extremely wide spectral reflection bands in one polarization. By arranging two or more such reflectors sequentially with orthogonal periodicities, there results an unpolarized spectral band that exceeds those of the individual polarized bands. The elemental polarization-sensitive reflectors based on one-dimensional resonant gratings have simple design, robust performance, and are straightforward to fabricate. The disclosed method combines two or more polarization-sensitive wideband reflectors to implement polarization-independent wideband reflectors with high reflectance values and robustness relative to parametric deviations and incidence angle.

Additional aspects of the disclosure and related embodiments are described in more detail in the detailed description which follows.

DETAILED DESCRIPTION OF THE INVENTION

The unpolarized reflector embodiments described herein can be understood more readily by reference to the following detailed description, examples, and figures. Elements, apparatus, materials and methods described herein, however, are not limited to the specific embodiments presented in the detailed description, examples, and figures. It must be recognized that these embodiments are merely illustrative of the principles of the present invention. Various modifications and adaptations will be readily apparent to those of skill in the art without departing from the spirit and scope of the invention.

Wideband reflectors are of interest in numerous applications. Resonant reflectors can be seen to complement current traditional thin-film reflectors that hold a strong commercial position. In contrast to thin-film reflectors at normal incidence, subwavelength grating reflectors are polarization sensitive, which is positive for some applications. Wideband polarizers that reflect one polarization state while they transmit the other have been shown to be feasible; these are interesting related applications [K. J. Lee, J. Curzan, M. Shokooh-Saremi, and R. Magnusson, "Resonant wideband polarizer with single silicon layer," Appl. Phys. Lett. 98, 21112 (2011)].

It is possible to implement polarization-insensitive subwavelength grating wideband reflectors by two-dimensional (2D) patterning as recently shown [M. Shokooh-Saremi and R. Magnusson, "Properties of two-dimensional resonant reflectors with zero-contrast gratings," Opt. Lett. vol. 39, pp 6958-6961 (2014)]. Polarization-insensitivity is also achievable with 1D structure but only across relatively small spectral bandwidths [Y. Ding and R. Magnusson, "Resonant leaky-mode spectral-band engineering and device applications." Opt. Exp. 12, 5661-5674 (2004)]. Recently, Zhao et al, proposed cross-stacked gratings on a single substrate for polarization-insensitive wideband reflection where TE and TM polarization share a common reflection band [D. Zhao, Yang, Z. Ma, and W Zhou, "Polarization independent broadband reflectors based on cross-stacked gratings." Opt. Exp. vol. 19, pp 9050-9055 (2011)]. Our disclosed invention fundamentally differs from the proposal of Zhao as our invention incorporates sequentially arranged independent devices that are not coupled by proximity as those in Zhao. Indeed, the bandwidth and efficiency of cross-stacked gratings as in Zhao are limited by one polarization; namely, by the narrower-band TE polarization.

Figure 3:
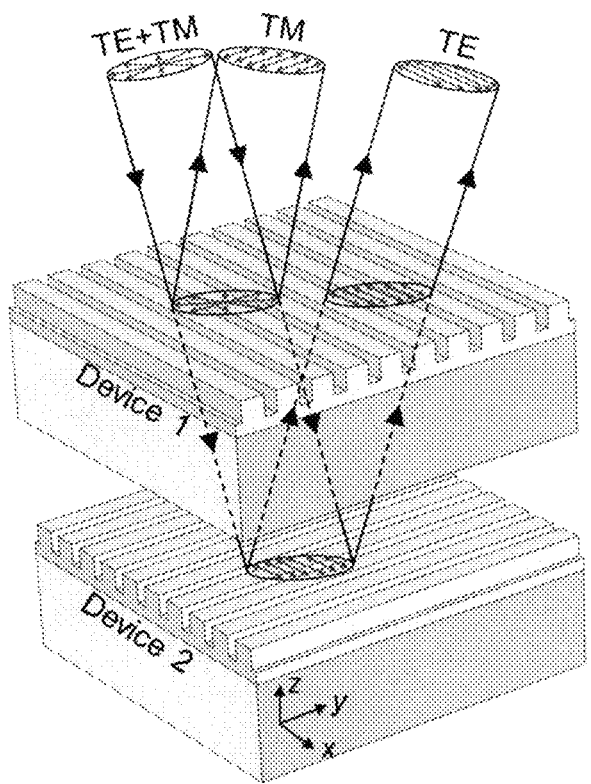
FIG. 3 depicts a schematic of the sequentially arranged wideband reflectors central to the invention. Device 1 and Device 2 are polarization-sensitive wideband reflectors made with zero-contrast gratings (ZCGs) working in TM polarization

Elaborating further, we investigate briefly the effect of sequentially arranging two polarization-sensitive wideband reflectors such that their grating vectors are orthogonal or nearly orthogonal. In the proposed sequential-arrangement, two polarization-sensitive 1D wideband reflectors, denoted as Device 1 and Device 2 in FIG. 3, have their grating vectors orthogonal to one another which means that their periodicities run along orthogonal directions. Let us assume that the devices are identical and designed to be fully reflective for TM polarization and partially reflective for TE polarization. For unpolarized light with both TE and TM components incident on the device pair as shown in FIG. 3, Device 1 near-completely reflects the TM components of the light, partially reflects the TE component, and partially transmits the TE components to Device 2. This transmitted TE light is TM polarized with respect to Device 2 as its grating vector is orthogonal to that of Device 1 and is therefore nearly completely reflected. The net result is near-complete reflection of both TE and TM components of unpolarized, or randomly polarized, incident light. In addition, since Device 1 and Device 2 partially reflect TE-polarized light, the overall reflectance of the sequential arrangement of two or more wideband reflectors will be higher than that of an individual polarization-selective wideband reflector. We show this herein in both theory and experiment. We also note that the sequentially arranged wideband reflectors do not need to be exactly identical as will be shown by our experimental results; thus the reflectors disclosed herein are robust to design-parameter deviations within reasonable limits.

Figure 2:
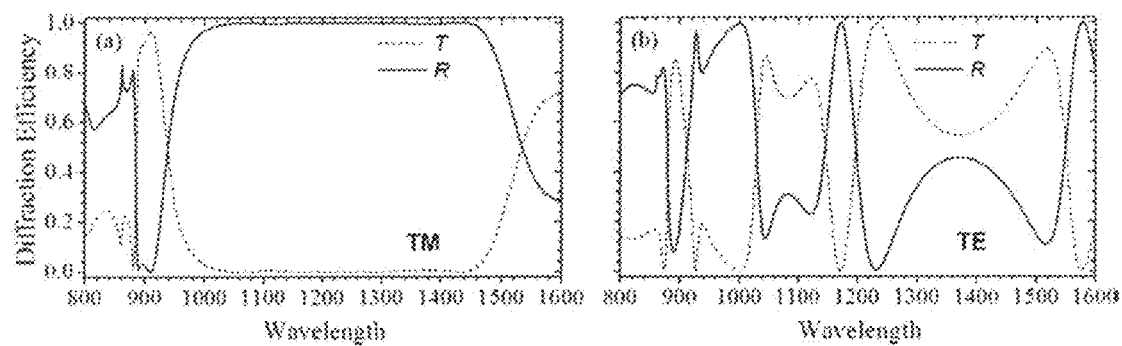
FIG. 2 illustrates the spectral performance of a polarization-sensitive wideband reflector displaying simulated TM polarized and TE polarized spectra.

Next, an experimental proof of the disclosed, unpolarized reflectors is provided. Thus, to verify the concept, we demonstrate a polarization-insensitive wideband reflector using sequential arrangement of two polarization-sensitive zero-contrast grating (ZCG) wideband reflectors. To demonstrate this in experiment, we use the wideband reflector design in FIG. 2. We fabricate this wideband reflector using a commercially available silicon-on-quartz (SOQ) wafer. The SOQ wafer has a 520 nm thick c-Si film on a quartz substrate. We use holographic lithography [W. W. Ng. C.-S. Hong, and A. Yariv, "Holographic interference lithography for integrated optics," IEEE Trans. Elect. Dev. vol. 25, pp 1193-1200 (1978)] to expose UVN-30, a negative photoresist (PR), creating a 1D mask. We reactive-ion etch through the c-Si layer using $SF_6+CHF_3$ gas mixture. Residual PR is removed by ashing in an $O_2$ ambient. We characterize the fabricated devices using atomic three microscopy (AFM) and scanning electron microscopy (SEM) while optimizing the fabrication process to achieve the desired device geometry. Photograph of an array of nine fabricated devices on a single SOQ wafer is shown in FIG. 4(a). Top-view SEM image of a representative device in FIG. 4(b) shows highly uniform grating lines. A cross-sectional SEM is shown in FIG. 4(c).

Figure 4:
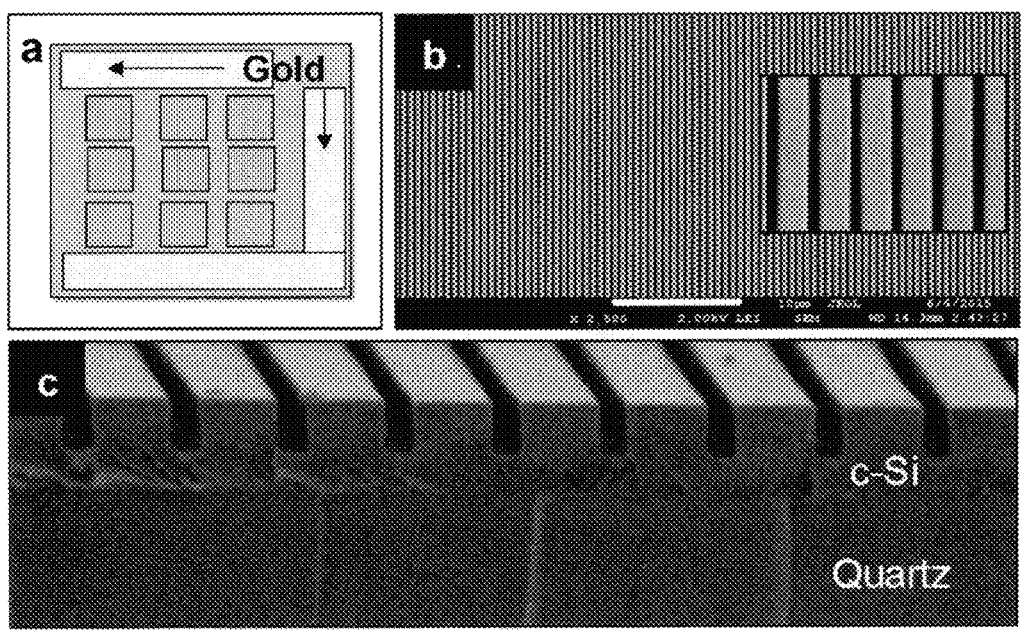
FIG. 4 illustrates fabricated 1D ZCG broadband mirrors. (a) Photograph of an array of nine fabricated devices on a 1×1 inch² SOQ wafer. Each device is 5×5 mm². Scanning-electron micrographs show (b) top-view and (c) cross-sectional images of a representative device.
Figure 5:
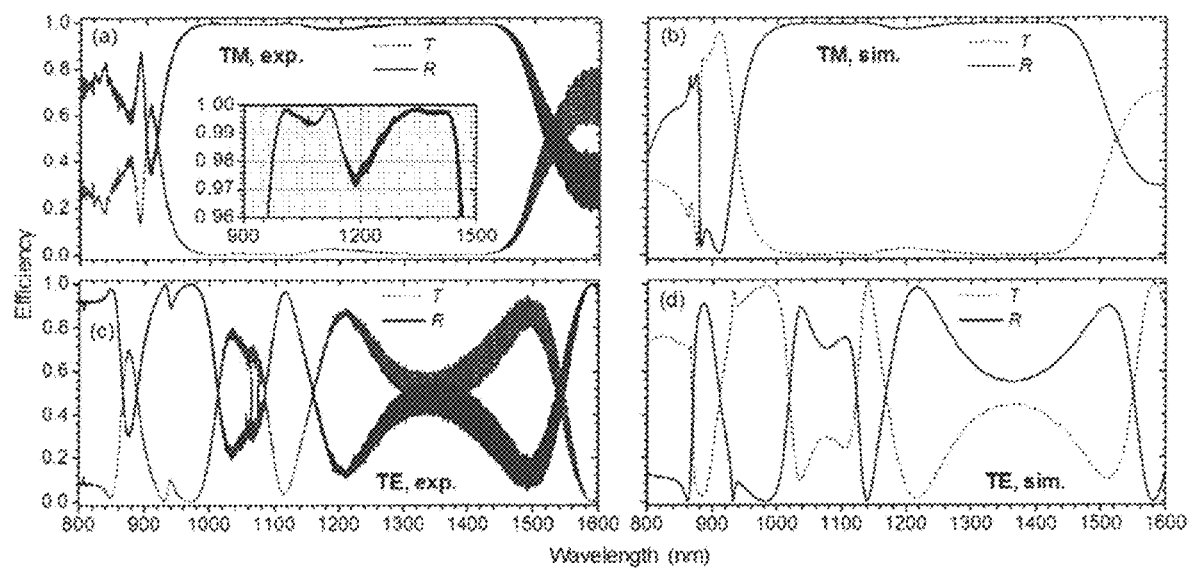
FIG. 5 shows polarization-dependent spectral response of a single ZCG reflector. (a) Experimental and (b) simulated zero-order T and R spectra for TM polarized light incidence. (c) Experimental and (d) simulated T and R spectra for TE polarized light incidence.

Spectral measurement results of this polarization-sensitive wideband reflector are shown in FIG. 5. In the measurements, we use a Koheras SuperK Compact light source and a Yokogawa AQ6370D near-infrared optical spectrum analyzer. The zero-order transmittance (T) is the transmitted signal normalized by the input signal in TM polarization. Due to the subwavelength nature of the gratings, only zero-order propagating waves in the substrate exist at wavelengths longer than the Rayleigh wavelength given by $\lambda_R = \Lambda n_S$ (~850 nm). In addition, we expect the scattering losses in c-Si to be insignificant because of the high degree of uniformity in the grating lines as shown in FIG. 4(b). It follows that R can be closely approximated as 1−T.

The experimental T and R spectra for TM polarized light incidence in FIG. 5(a) correspond to a fabricated device with parameters F=0.63, $d_g$=330 nm, $d_h$=190 nm, and $\Lambda$=560 nm. Normal angle of incidence ($\theta$=0°) is maintained. The measured reflectance spectrum features a 490-nm-wide spectral band stretching from ~960 nm to ~1450 nm with greater than 97% efficiency. The RCWA-simulated TM spectrum in FIG. 5(b) shows an excellent quantitative agreement with the experimental spectrum in FIG. 5(a). In the numerical simulations we account for material dispersion and use device geometrical parameters obtained from AFM and SEM measurements. Material dispersion for crystalline silicon is obtained from [M. A. Green, "Self-consistent optical parameters of intrinsic silicon at 300 K including temperature coefficients," Sol. Energy Mater. Sol. Cells, vol. 92, pp 1305-1310 (2008)]. FIG. 5(c) and FIG. 5(d) also show good quantitative agreement between measured and simulated spectra for TE polarized light incidence. The TE polarization does not exhibit wideband reflection. Here it is experimentally shown that indeed a 1D ZCG wideband reflector is polarization sensitive.

The one-dimensionality of gratings in the fabricated devices results in a different spectral response for TE and TM polarizations, as shown in FIG. 5. Taking advantage of this difference, broadband polarizers where one polarization is near-completely transmitted and another is near-completely reflected have been proposed [K. J. Lee, J. Curzan, M. Shokooh-Saremi, and R. Magnusson, "Resonant wideband polarizer with single silicon layer," Appl. Phys. Lett. 98, 21112 (2011)]. However, as broadband mirrors, polarization-insensitive performance is desirable in many applications. Recently, dielectric gratings periodic in two-dimensions were proposed to reflect both TE and TM polarizations of light [M. Shokooh-Saremi and R. Magnusson, "Properties of two-dimensional resonant reflectors with zero-contrast gratings," Opt. Lett. vol. 39, pp 6958-6961 (2014); K. Ikeda, K. Takeuchi, K. Takayose, L-S. Chung, J. Mørk, and H. Kawaguchi, "Polarization-independent high-index contrast grating and its fabrication tolerances," Appl. Opt. vol. 52, pp 1049-1053 (2013)]. Here, we experimentally demonstrate a polarization-insensitive spectral response by sequentially arranging two polarization-sensitive wideband reflectors. In a sequential-arrangement, two wideband reflectors, denoted as Device 1 and Device 2 in FIG. 6(a), have their grating vectors, and associated directions of periodicity, orthogonal to one another. For unpolarized light incidence, Device 1 near-completely reflects the TM components of the light and partially transmits the TE components to Device 2. This transmitted light is TM polarized with respect to Device 2, and is near-completely reflected, resulting in near-complete reflection of both TE and TM components of the incident light. Unpolarized light is defined herein as light, or other form of an electromagnetic wave, that contains simultaneously both a nonzero TE component and a nonzero TM component.

Figure 6:
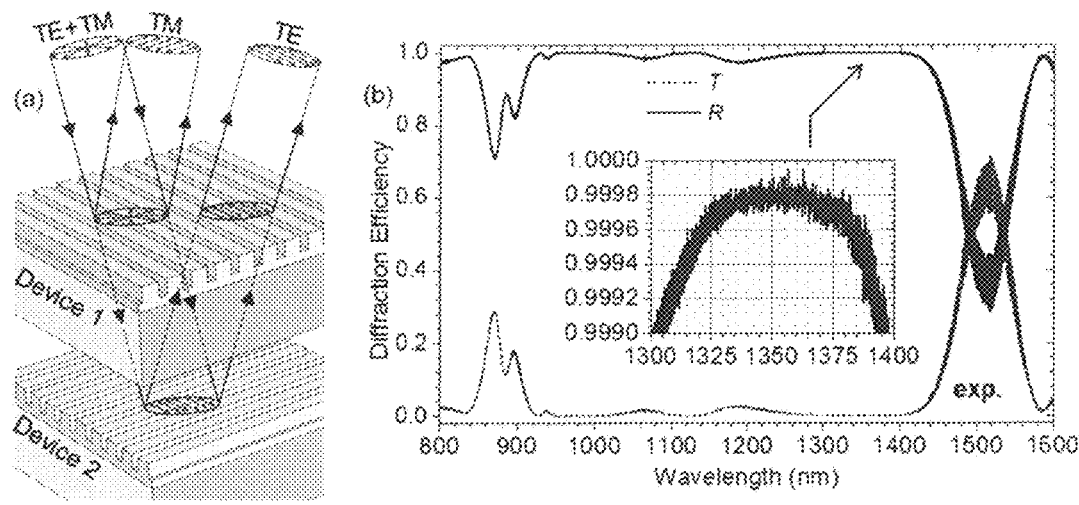
FIG. 6 illustrates a polarization-independent spectral response achieved with the disclosed reflectors. (a) Experimental setup showing two sequentially arranged broadband mirrors. Device 1 mostly reflects TM components and Device 2 mostly reflects TE (relative to Device 1) components of unpolarized incident light possessing both transverse-electric and transverse-magnetic (TE+TM) components. (b) Measured T and R data using the experimental setup illustrated in (a) for unpolarized light at normal incidence. Inset in the figure shows the wavelength band for R>99.9%.

Using identical process conditions as for the single wideband reflector in FIG. 5, we fabricate a second wideband reflector with similar geometrical and performance parameters. We sequentially arrange these wideband reflectors such that their grating vectors are orthogonal to each other, as shown in FIG. 6(a). Measured spectrum using unpolarized light at normal incidence is shown in FIG. 6(b). Here, the 500-nm-wide reflection band from 920 nm to 1420 nm lies above 97% in reflectance. Moreover, an 85-nm-wide reflection band centered at 1350 nm has ultra-high reflectance with efficiency exceeding 99.9% and parts of that subband exhibit near 99.99% in reflectance. The reflectance measured in FIG. 6(b) is wider and has higher efficiency than the reflectance of the single polarization-sensitive device in FIG. 5(a). Thus, we demonstrate here that a sequential arrangement improves the performance of wideband reflectors in addition to making them versatile by introducing polarization insensitivity.

Figure 1:
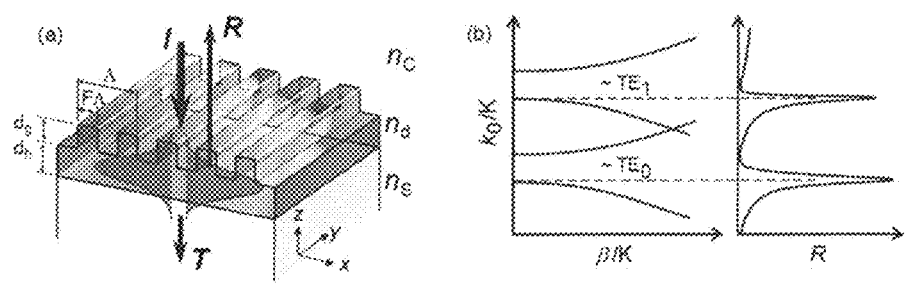
FIG. 1 illustrates a model of a subwavelength periodic element under normal incidence along with a pertinent schematic dispersion diagram at the second stop band.
Figure 7:
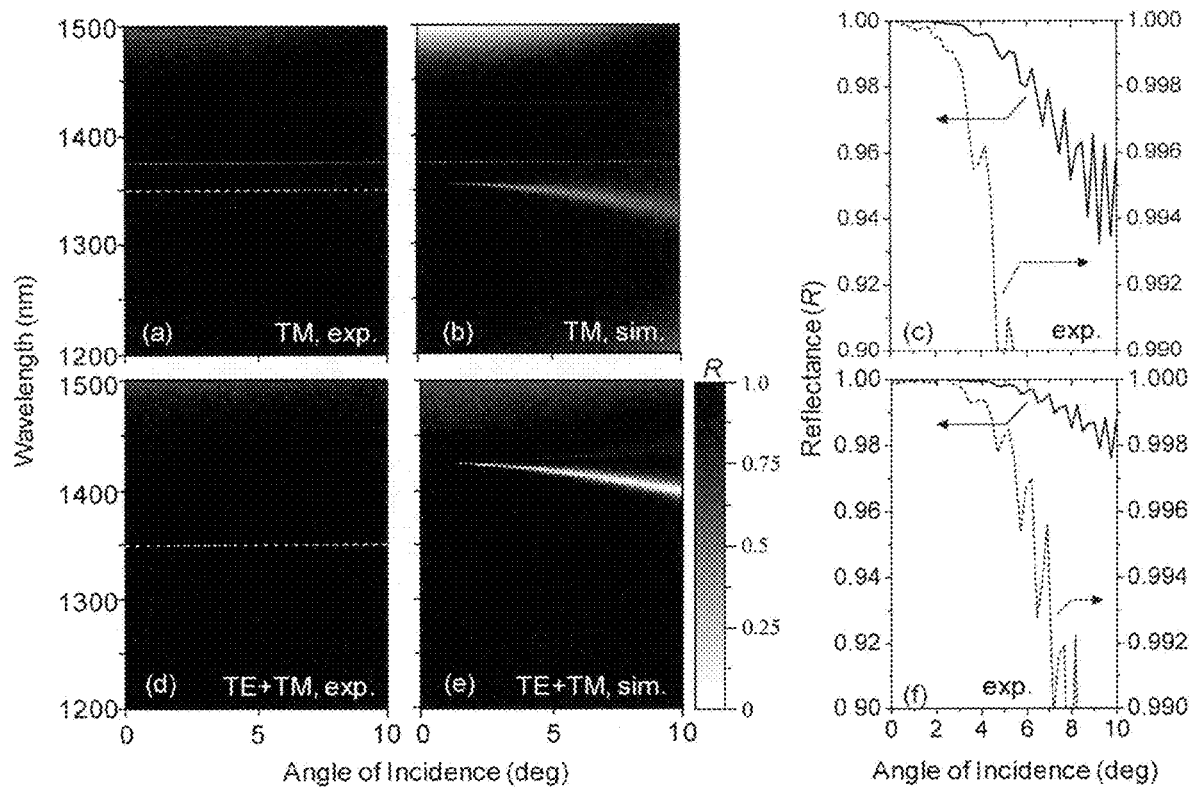
FIG. 7 illustrates the spectral response under variation of the angle of incidence. (a) Measured and (b) simulated zero-order reflectance ($R_0$) maps for different polar angles corresponding to a polarization-dependent mirror for TM-polarized light incidence. (c) Angular $R_0$ corresponding to λ=1350 nm in (a). (d)-(e) $R_0$ maps for polarization-independent serial configuration for unpolarized light incidence showing (d) measurement and (e) simulation results. (f) Angular $R_d$ corresponding to $\lambda=1350$ nm in (d). Dashed lines in (a) and (d) represent $\lambda=1350$ nm.

The experimental spectra in FIG. 5(a) and FIG. 6(b) exhibit ultra-high-efficiency reflection band centered at ~1350 nm wavelength of light. We study the performance of this band with small variations in polar angle of incidence, $\theta$. For a polarization-sensitive wideband reflector with structure as illustrated in FIG. 1(a), we assume that the incident wave vector remains in the x-z plane and $\theta$ is defined as the angle between the wave vector and the z-axis. Results from this study are presented in FIG. 7. Measured and simulated angle-dependent reflectance maps corresponding to a polarization-sensitive wideband reflector for TM polarized light incidence are shown in FIG. 7(a) and FIG. 7(b), respectively. Reflectance maps for unpolarized light incidence corresponding to sequential arrangement are shown in FIG. 7(d) for measurement and FIG. 7(e) for simulation. FIG. 7(c) and FIG. 7(f) show line plots at $\lambda$=1350 nm corresponding to FIG. 7(a) and FIG. 7(d), respectively. These experimental results show robust performance of the wideband reflectors at small angular variations. For instance, at $\lambda$=1350 nm, $R_0 \geq 99.9\%$ covers $\theta \leq 2.75°$ for the polarization-sensitive wideband reflector and $\theta \leq 4.25°$ for the polarization-insensitive sequential arrangement. At the same wavelength, $R_0 \geq 99\%$ covers up to 4.75° and 7.75° in $\theta$ for polarization-sensitive and polarization-insensitive cases, respectively. Simulation results also show that the sequential arrangement of the wideband reflectors as in FIG. 7(e) is more angularly tolerant compared to an individual polarization-sensitive wideband reflector as in FIG. 7(b). This experiment clearly shows that the sequential arrangement improves both the efficiency and angular tolerance of the disclosed polarization-independent wideband reflectors.

Here, we have used a zero-contrast grating (ZCG) [R. Magnusson, "Wideband reflectors with zero-contrast gratings," Opt. Lett. 39, 4337-4340 (2014)] architecture as an example to quantify the performance of the serially arranged reflectors in attaining unpolarized wideband reflection. We focus on ZCG gratings as they provide the widest and most robust reflection bands reported to date while remaining structurally simple [R. Magnusson, "Wideband reflectors with zero-contrast gratings," Opt. Lett. 39, 4337-4340 (2014)]. We note that the arrangement in FIG. 3 also applies to other grating architectures including so-called high-contrast gratings (HCG) [C. J. Chang-Hasnain and W. Yang, "High-contrast gratings for integrated optoelectronics," Adv. Opt. Photonics, vol. 4, pp. 379-440 (2012)]. Thus, the fundamental ideas behind this invention also apply to such embodiments. We note that the grating vector orientation of two sequentially arranged reflectors does not have to be exactly orthogonal; it can also be near orthogonal to within reasonable limits.

To complete the detailed description of the invention, some embodiments described herein are further illustrated in the following non-limiting examples. Examples of additional embodiments and pertinent properties and features are further provided.

Example 1

Sequentially Arranged Wideband Reflector Concept

FIG. 3 illustrates a sequentially arranged wideband reflector schematic. Device 1 and Device 2 are polarization-sensitive wideband reflectors made with zero-contrast gratings (ZCGs) working in TM polarization. When the devices are sequentially arranged such that their grating planes are parallel (x-y plane) and their grating vectors K are orthogonal to one another, wherein K is along the y-axis for Device 1 and the x-axis for Device 2, the overall sequential-arrangement becomes polarization insensitive. For unpolarized input light with TE+TM components, Device 1 near-completely reflects the TM components and partially transmits the TE components. This transmitted TE component is TM polarized with respect to Device 2 and is also completely reflected. This results in near-complete reflection of both TE and TM components resulting in polarization-insensitive wideband reflection. Note that because Device 1 and Device 2 also partially reflect TE components, the overall reflection efficiency of this sequential-arrangement is higher than that of an individual polarization-insensitive wideband reflector. There is a separation distance between the two devices across a gap (in air or other media) extending from the bottom of the substrate of Device 1 to the grating top surface of Device 2 as illustrated in this example. The arrangement of Device 1 relative to Device 2 could also take the form of the two gratings facing each other across a gap or the two substrates facing each other across a gap.

Example 2

Experimental Demonstration of Unpolarized Wideband Reflectors With Sequential ZCGs FIG. 4 depicts SEMs pertinent to a fabricated 1D ZCG broadband mirror. FIG. 4(a) shows a photograph of an array of nine fabricated devices on a 1×1 inch$^2$ SOQ wafer. Each device is 5×5 mm$^2$. Approximately 100-nm-thick gold film is sputtered on the non-device edges of the SOQ wafer. Scanning-electron micrographs showing FIG. 4(b) top-view and FIG. 4(c) cross-sectional images of a representative device. FIG. 5 presents the polarization-dependent spectral response of one of the devices in the array. In particular, FIG. 5(a) shows experimental and FIG. 5(b) simulated zero-order T and R spectra for TM polarized light incidence. FIG. 5(c) furnishes experimental and FIG. 5(d) simulated T and R spectra for TE polarized light incidence. Device parameters are fill factor F=0.63, grating depth $d_g$=330 nm, c-Si film thickness t=520 nm, and grating period Λ=560 nm in both experiment and simulation. Inset in FIG. 5(a) shows the wavelength band for R>96%. In the experiments reported in FIG. 5(a) and FIG. 5(c), R is approximated as 1−T. Spectral noise in the measurements at λ>1200 nm is due Fabry-Perot resonances in the device substrate. FIG. 6(a) shows the experimental setup involving two sequentially arranged broadband mirrors. Device 1 mostly reflects TM components and Device 2 mostly reflects TE (relative to Device 1) components of unpolarized incident light possessing both transverse-electric and transverse-magnetic (TE+TM) components. FIG. 6(b) shows measured T and R data using the experimental setup illustrated in FIG. 6(a) for unpolarized light at normal incidence. Inset in FIG. 6(b) shows the wavelength band for R>99.9%. In FIG. 6(b), R is approximated as 1−T. FIG. 7 quantities the attendant angle-dependent spectral response. FIG. 7(a) shows measured and FIG. 7(b) simulated zero-order reflectance (R=$R_0$) maps for different polar angles corresponding to a polarization-dependent mirror for TM-polarized light incidence. FIG. 7(c) provides angular variation of $R_0$ corresponding to λ=1350 nm in FIG. 7(a). FIG. 7(d) and FIG. 7(e) show reflectance maps for polarization-independent serial configuration for unpolarized light incidence for FIG. 7(d) measurement and FIG. 7(e) simulation results. FIG. 7(f) provides angular variation of $R_0$ corresponding to λ=1350 nm in FIG. 7(d). In measurements, $R_0$ is approximated as 1−$T_0$. Dashed lines in FIG. 7(a) and FIG. 7(d) represent λ=1350 nm.

Example 3

Experimental Reflector Fabricated in Amorphous Silicon-On-Glass

Figure 8:
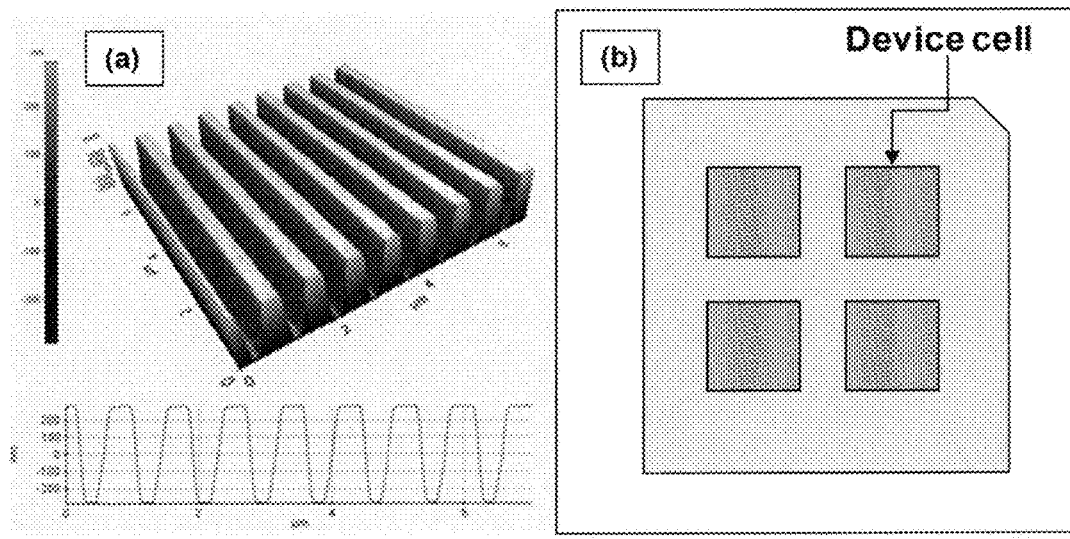
FIG. 8 illustrates aspects of fabricated 1D ZCG reflectors. (a) AFM image of a typical device surface. (b) An array of 5×5 mm² devices.
Figure 9:
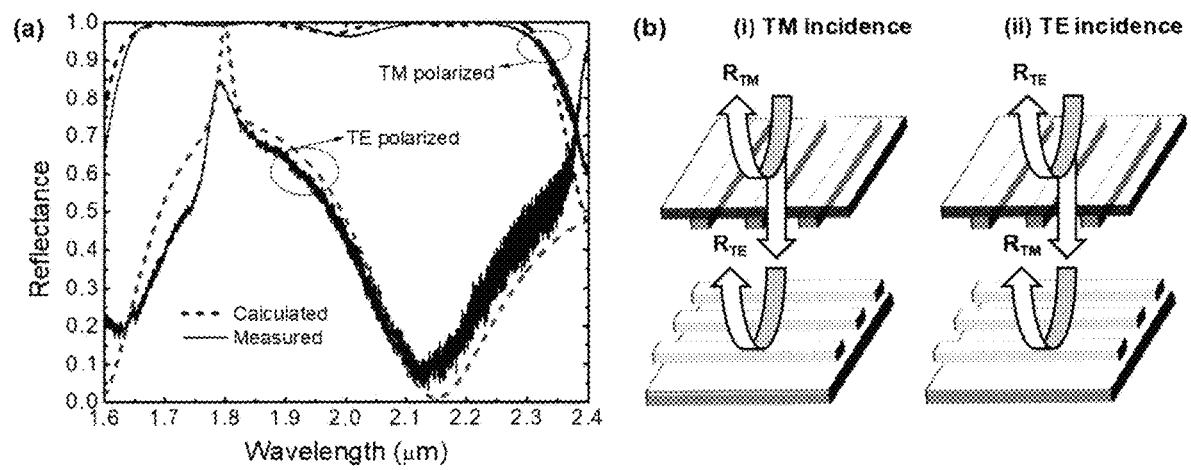
FIG. 9 illustrates (a) reflection spectra of fabricated 1D ZCG reflectors showing experimental and theoretical results and (b) conceptual operation of sequential ZCG reflectors with orthogonal periodicity under TE and TM polarized light incidence.

In a second experimental example, we implement the sequential ZCG arrangement shown in FIG. 3 with a pair of wideband reflectors fabricated in a silicon-on-glass platform as opposed to the previous SOQ example. The two polarization-sensitive reflectors share similar experimental grating parameters that are Λ=856 nm, F=0.54, $d_g$=563 nm, and $d_h$=408 nm. FIG. 8(a) shows an AFM of a representative fabricated device and FIG. 8(b) shows an SEM of a 2×2 array of devices that each measure 5×5 mm$^2$. The reflectors are made with a-Si sputtered onto a substrate of soda-lime glass. FIG. 9(a) reveals the spectral properties of a single prototype a-Si ZCG reflector depicting both numerical and experimental data. There results a wide high-efficiency band for TM polarization extending from λ~1.7 μm to λ~2.3 μm. FIG. 9(b) schematically shows the response of the serial reflectors to the two polarization components present in the input wave; the amplitudes of these components are not necessarily the same.

Figure 10:
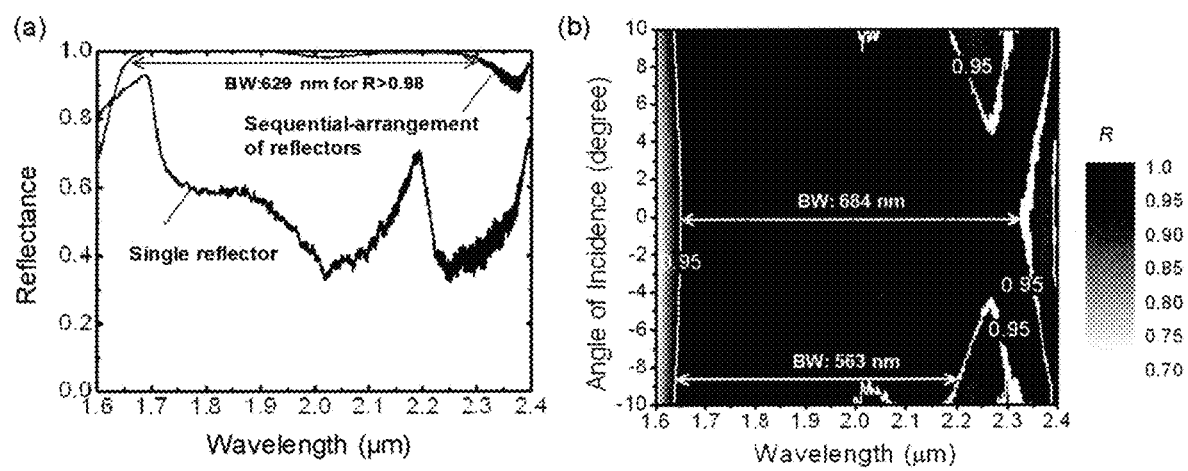
FIG. 10 shows the measured reflectance characteristics of two sequential ZCG devices belonging to the class of disclosed devices. (a) Measured zero-order reflectance spectra in comparison with those for a single 1D grating reflector for unpolarized light and (b) reflectance map as a function of the angle of incidence from −10 to 10 degrees for the sequential reflectors.

Under unpolarized light incidence, for sequentially arranged ZCG reflectors, high reflectance exceeding 98% maintains, exhibiting a broadband spectral response encompassing a 629 nm-wide spectral band as shown in FIG. 10(a). However, as shown and as expected, a single reflector does not exhibit wideband spectral response for unpolarized light. This is because this single polarization-sensitive ZCG does not provide high wideband reflectance for TE polarization. Moreover, the serial, unpolarized reflector has favorable angular characteristics. From FIG. 10(b) it is clear that the sequential arrangement of wideband reflectors possesses considerable angular tolerance. For θ up to ±8 degrees, this prototype provides a 563-nm-wide spectral band exceeding 95% in reflectance.

Example 4

Sequentially Arranged a Wideband Reflector Pairs

Figure 11:
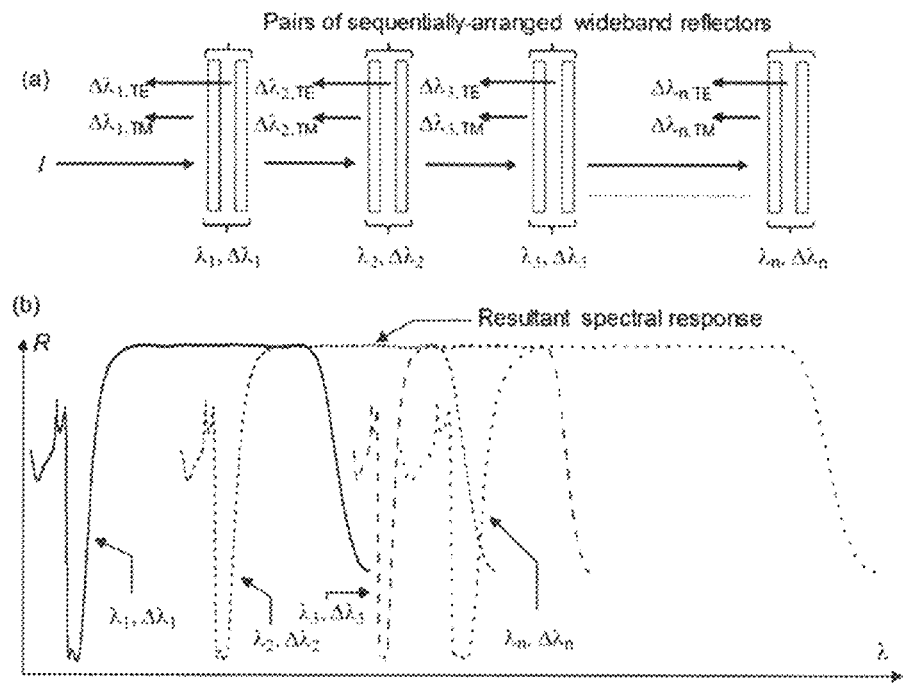
FIG. 11 illustrates a sequential arrangement of n pairs of polarization-independent wideband reflectors with different operating wavelengths, according to one inventive embodiment described herein.

The concept of sequential assembly of ZCGs to realize unpolarized wideband reflectors can by extended to n reflector pairs, as shown in FIG. 11, to increase the width and efficiency of a reflection band. In FIG. 11(a), a schematic representation of n pairs of polarization-independent wideband reflectors with different operating wavelengths $\lambda_1$, $\lambda_2$, $\lambda_3$, . . . , $\lambda_n$, and reflection bandwidths $\Delta\lambda_1$, $\Delta\lambda_2$, $\Delta\lambda_3$, . . . , $\Delta\lambda_n$, respectively is shown. Each pair represents a polarization-independent wideband reflector, with one center wavelength ($\lambda$) and reflection bandwidth ($\Delta\lambda$), sequentially arranged. Under broadband light incidence, the first pair reflects unpolarized bandwidth $\Delta\lambda_1$ centered at $\lambda_1$. The second pair reflects bandwidth $\Delta\lambda_2$ centered at $\lambda_2$ and so on. Consequently, all design wavelengths at both light polarizations are reflected with high efficiency by the sequential arrangement in FIG. 11(a). The spectral response looks like that in FIG. 11(b). There, the high-efficiency reflection band represents the resultant reflection band. This type of serial arrangement of individual reflectors can be implemented to cover wide spectral bands. Moreover, a multi-element reflector thus fashioned can be designed to operate across multiple spectral bands that are not adjacent to one another but distinct with low reflection regions between selected high-reflectance bands.

Example 5

Effect of the Separation Gap Between ZCG Reflectors on Spectral Response

The effect of the gap distance between two sequential wideband reflectors is addressed for an example case from which the general case can be understood in broad terms. A schematic is shown in FIG. 12(a) where two 1D grating wideband reflectors are sequentially assembled with their grating vectors orthogonal to each other. Each wideband reflector is made of silicon ZCG on a glass substrate. There exists an air gap, $D_{air}$, between the two reflectors as noted. An air gap is considered in this case for convenience although the gap could be filled with vacuum, liquids, adhesives, polymers, or other media. The RCWA simulated reflectance $R_0$ with variation in the air gap ($D_{air}$) is shown in FIG. 12(b). The geometric parameters in this study are $n_C$=air, $n_d$=silicon, $n_S$=glass, $\Lambda$=858 nm, F=0.55, $d_g$=565 nm, and $d_h$=410 nm. Clearly, the polarization-insensitive reflection does not significantly change with change in under variation from approximately 1 μm to 100 μm as seen in the figure; the key is to keep the reflector uncoupled. This shows that the serial configuration of two wideband reflectors is robust against variations in the gap distance between the reflectors providing flexibility in this parameter upon fabrication.

Example 6

Unpolarized Reflectors in the 2-12 μm Spectral Region

Figure 13:
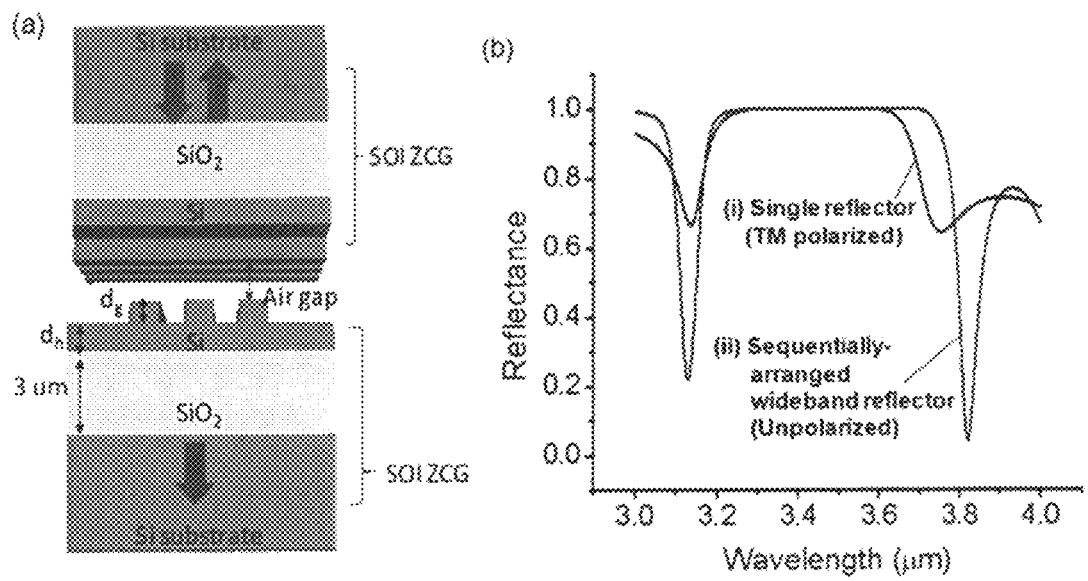
FIG. 13 illustrates in (a) a schematic diagram of wideband reflectors with silicon-on-insulator (SOI)-based ZCG structures and in (b) calculated reflectance spectra for (i) single ZCG reflector for TM polarization and (ii) sequentially arranged reflector for random polarization.

In principle, the disclosed reflectors can be made in any wavelength and for which there exist low-loss materials that can be fashioned into the requisite design architecture. Here, we show examples of reflectors residing within the important 2-12 μm infrared spectral region. FIG. 13(a) displays as model for such longer wavelengths employing sequentially arranged wideband reflectors made with silicon-on-insulator (SOI)-based ZCGs. Considering a typical SOI wafer, the thickness of the buried oxide (BOX) layer $SiO_2$ is fixed to 3 μm. For optimization of wideband reflectors at 3-4 μm wavelengths, we find appropriate grating parameters including period ($\Lambda$), fill factor (F), grating depth ($d_g$) and thickness of the sublayer ($d_h$). FIG. 13(b) reveals the calculated reflectance spectra of an optimized polarization independent reflector compared to the spectrum of a single ZCG reflector that constitutes half of the unpolarized device. The design parameters are $\Lambda$=1540 nm, F=0.55, $d_g$=850 nm, and $d_h$=1030 nm. For the single ZCG reflector (i), the reflection bandwidth is ~379 nm for which $R_0$>0.99 under TM polarization. On the other hand, the sequential ZCGs (ii) provide increased reflection bandwidth of 439 nm for which $R_0$>0.99 while insuring polarization independence.

Figure 14:
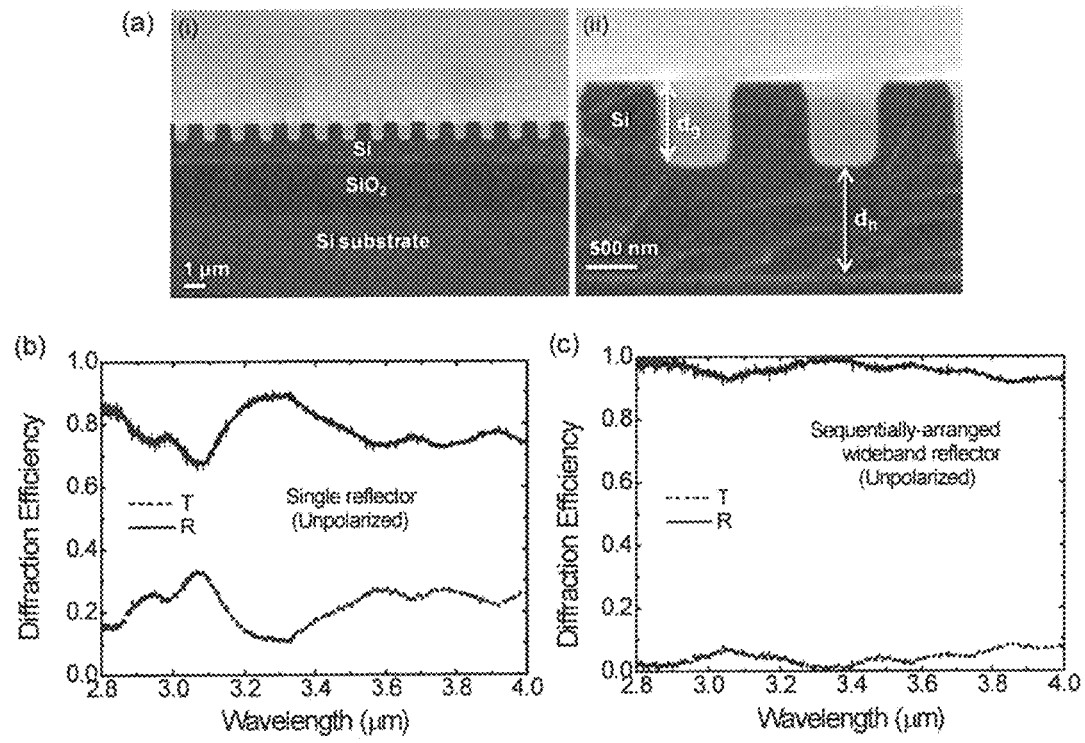
FIG. 14 illustrates (a) SEM images of a fabricated ZCG with SOI structure with (i) perspective and (ii) magnified views. The experimental grating parameters are $\Lambda=1530$ nm, $F=0.54$, $d_g=860$ nm, and $d_h=1082$ nm. Under unpolarized light, the T and R spectra are characterized for (b) single and (e) sequentially arranged reflectors respectively where R is approximated as 1−T.

The device is fabricated by holographic interference lithography and conventional dry etching processes. In order to control the thickness of the SOI device layer, we etch the Si surface of the wafer uniformly via a reactive-ion etching (RIE) machine prior to device fabrication. The SEM images qualify the profile of the fabricated gratings as shown in FIG. 14(a). In a perspective view of the SEM image in (i), the 1D ZCG clearly forms on the insulating layer without any major defects. The magnified view in (ii) confirms the grating parameters as $\Lambda$=1530 μm, F=0.54, $d_g$=860 nm, and $d_h$=1082 nm. Assuming lossless materials at wavelengths in the range 2.8-4 μm, we characterize the R and T spectra of our fabricated devices by Fourier-transform infrared spectroscopy (FTIR). FIG. 14(b) and FIG. 14(c) show the measured spectra for single and sequential reflectors respectively. In comparison to the single reflector, the serial device exhibits a much large reflectance for unpolarized light input. High reflectance exceeding 95% covers a wide range of wavelengths from 3.19 μm to 3.75 μm. These experiments verify predictions of excellent wideband reflection performance under unpolarized light illumination for these mid-IR wavelengths.

Figure 12:
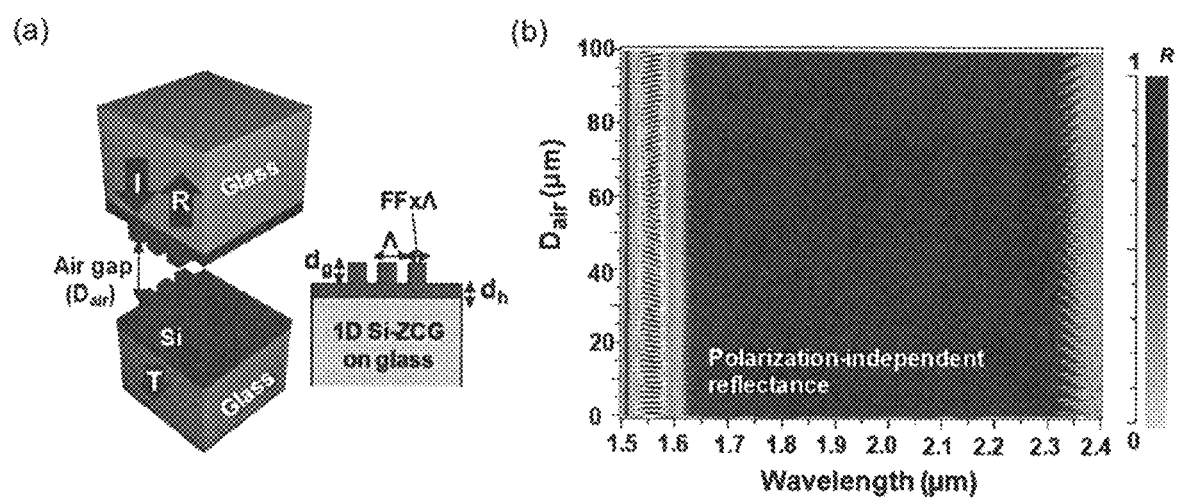
FIG. 12 illustrates in (a) models of serial devices with Si-based 1D ZGC reflectors and in (b) calculated reflectance map as a function of air gap distance from 0 to 100 μm.
Figure 15:
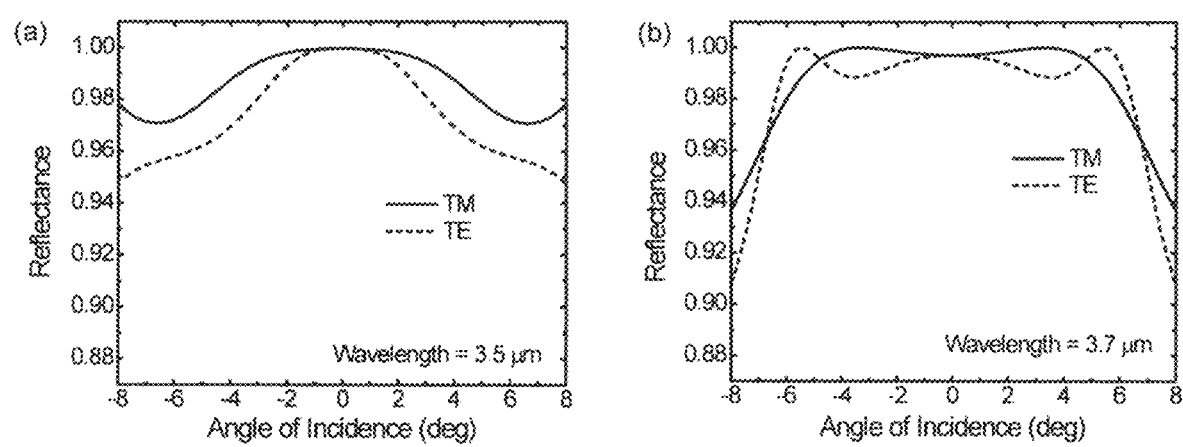
FIG. 15 illustrates simulated angular reflectance as a function of polar angles at (a) $\lambda=3.5$ μm and (b) $\lambda=3.7$ μm.

Finally, we find that these devices are robust relative to the angle of incidence as also shown for shorter wavelengths in FIG. 12. Thus, FIG. 15 shows reflectance variations of the corresponding sequential reflector in FIG. 13(a) against change of the polar angle of incidence θ. As displayed in FIG. 15(a) and FIG. 15(b), the device exhibits relatively small angular variations for TE and TM polarizations. Quantitatively, at $\lambda$=3.5 μm, high zero-order reflectance R>97% covers −3.9°≤θ≤3.9° for both polarizations. Also, the sequential reflector provides good angular tolerance at another sample wavelength in the band $\lambda$=3.7 μm where high reflectance exceeding 99% covers −3°≤θ≤3° for both polarization states.

REFERENCES

1. R. Magnusson, "Wideband reflectors with zero-contrast gratings," Opt. Lett. 39, 4337-4340 (2014).
2. C. F. R. Mateus, M. C. Y. Huang, C. J. Chang-Hasnain, and Y. Suzuki, "Broad-band mirror (1.12-1.62 μm) using a subwavelength grating," IEEE Phot. Tech. Lett. 16, 1676-1678 (2004).
3. M. Niraula, J. W. Yoon, and R. Magnusson, "Mode-coupling mechanisms of resonant transmission filters," Opt. Exp. 22, 25817-25829 (2014).
4. D. Fattal, J. Li, Z. Peng, M. Fiorentino, and R. G. Beausoleil, "Flat dielectric grating reflectors with focusing abilities," Nat. Photon. 4, 466-470 (2010).

5. S. Y. Chou and W. Deng, "Subwavelength amorphous silicon transmission gratings and applications in polarizers and waveplates," Appl. Phys. Lett. 67, 742-744 (1995).
6. K. J. Lee, J. Curzan, M. Shokooh-Saremi, and R. Magnusson, "Resonant wideband polarizer with single silicon layer," Appl. Phys. Lett. 98, 21112 (2011).
7. H. A. Macleod, Thin-Film Optical Filters (McGraw-Hill, New York, ed. 2, 1989).
8. Y. Ding and R. Magnusson, "Resonant leaky-mode spectral-band engineering and device applications," Opt. Exp. 12, 5661-5674 (2004).
9. D. Rosenblatt, A. Sharon, and A. A. Friesem, "Resonant grating waveguide structure," IEEE J. Quantum Electron., vol. 33, pp. 2038-2059, November 1997.
10. Y. Ding and R. Magnusson, "Band gaps and leaky-wave effects in resonant photonic-crystal waveguides," Opt. Express, vol. 15, pp. 680-694, Jan. 22, 2007.
11. R. F. Kazarinov and C. H. Henry, "Second-order distributed feedback lasers with mode selection provided by first-order radiation loss," IEEE J. Quantum Electron., vol. 21, pp. 144-150, February 1985.
12. T. K. Gaylord and M. G. Moharam, "Analysis and applications of optical diffraction by gratings," in Proc. IEEE, vol. 73, pp. 894-937, 1985.
13. M. G. Moharam, D. A. Pommet, E. B. Grann, and T. K. Gaylord, "Stable implementation of the rigorous coupled-wave analysis for surface-relief gratings: enhanced transmittance matrix approach," J. Opt. Soc. Am. A, vol. 12, pp. 1077-1086, May 1995.
14. J. Kennedy and R. Eberhart, "Particle swarm optimization," Proceedings of the IEEE International Conference on Neural Networks, vol. 4, pp. 1942-1948, (1995).
15. M. Shokooh-Saremi and R. Magnusson, "Properties of two-dimensional resonant reflectors with zero-contrast gratings," Opt. Lett. vol. 39, pp 6958-6961 (2014).
16. D. Zhao, H. Yang, Z. Ma, and W Zhou, "Polarization independent broadband reflectors based on cross-stacked gratings," Opt. Exp. vol. 19, pp 9050-9055 (2011).
17. W. W. Ng, C.-S. Hong, and A. Yariv, "Holographic interference lithography for integrated optics," IEEE Trans. Elect. Dev. vol. 25, pp 1193-1200 (1978).
18. M. A. Green, "Self-consistent optical parameters of intrinsic silicon at 300 K including temperature coefficients," Sol. Energy Mater. Sol. Cells, vol. 92, pp 1305-1310 (2008).
19. K. Ikeda, K. Takeuchi, K. Takayose, I.-S. Chung, J. Mørk, and H. Kawaguchi, "Polarization-independent high-index contrast grating and its fabrication tolerances," Appl. Opt. vol. 52, pp 1049-1053 (2013).
20. C. J. Chang-Hasnain and W. Yang, "High-contrast gratings for integrated optoelectronics," Adv. Opt. Photonics, vol. 4, pp. 379-440 (2012).

That which is claimed is:

1. A polarization independent resonant wideband reflector comprising:
    a first wideband zero-contrast grating (ZCG) reflector denoted as Device 1
    a second wideband ZCG reflector denoted as Device 2
    wherein the ZCG reflectors denoted as Device 1 and Device 2 are arranged sequentially separated by a gap distance
    wherein the grating vectors of said sequentially-arranged reflectors are orthogonal
    wherein the ZCGs denoted as Device 1 and Device 2 each comprise a distinct substrate region, a cover region, and a grating layer disposed on the substrate region, the grating layer in each Device 1 and Device 2 comprising a periodic structure and a homogeneous sublayer beneath the grating structure and adjacent to the substrate, the periodic grating layer and the homogeneous sublayer being made out of the same material
    and wherein the gratings in each of Device 1 and Device 2 have subwavelength periods such that no higher-order diffracted waves exist.

2. The polarization Independent resonant wideband reflector in claim 1, wherein the periodic grating layers of the first and the second ZCG reflectors lie on parallel planes.

3. The polarization independent resonant wideband reflector in claim 1, wherein the grating vectors of the first and the second ZCG reflectors are orthogonal.

4. The polarization Independent resonant wideband reflector in claim 1, wherein the grating vectors of the first and the second ZCG reflectors are nearly orthogonal.

5. The polarization independent resonant wideband reflector in claim 1, where the first and the second ZCG reflectors constitute the same materials.

6. The polarization independent resonant wideband reflector in claim 1, where the first and the second ZCG reflectors constitute different materials.

7. The polarization independent resonant wideband reflector in claim 1, where the first and the second ZCG reflectors have the same structure.

8. The polarization independent resonant wideband reflector in claim 1, where the first and the second ZCG reflectors have different structures.

9. The polarization independent resonant wideband reflector in claim 1 designed to operate in any of the spectral regions selected from the groups of the ~1.2- to 12-μm spectral region, the ~700-1200 nm region, the visible region spanning ~400-700 nm, the ~10- to 100-μm region, or the THz to GHz microwave region.

10. The device structure in claim 9, wherein the illuminating incident wave is reflected across a wide spectral bandwidth with efficiency exceeding 90%.

11. The device structure in claim 1, wherein more than 2 pairs of ZCGs with orthogonal grating vectors reflect spectra in adjacent spectral regions to extend the reflection bandwidth of said device structure.

12. The device structure in claim 11, wherein more than 2 pairs of ZCGs with orthogonal grating vectors reflect spectra in nonadjacent spectral regions to extend the reflection bandwidth of said device structure.

13. The device structure in claim 1, where the thickness of the homogeneous layer in the first ZCG reflector is zero and where the thickness of the homogeneous layer in the second ZCG reflector is zero.

14. The device structure in claim 1, where either the first or the second ZCG reflector has a zero homogeneous layer thickness.

15. The device structure in claim 1, where the spatial gap between the pairs of ZCG reflectors is zero.

16. The device structure in claim 1, where the pairs of ZCG reflectors are designed to operate in different wavelength ranges.

17. The device structure in claim 1 embedded in a medium selected from the groups of air, water, liquids, adhesives, or polymer media systems.

* * * * *